Jan. 7, 1941.  H. C. BRAUN  2,227,698
COLLAPSIBLE BEEF TREE
Filed Aug. 30, 1939
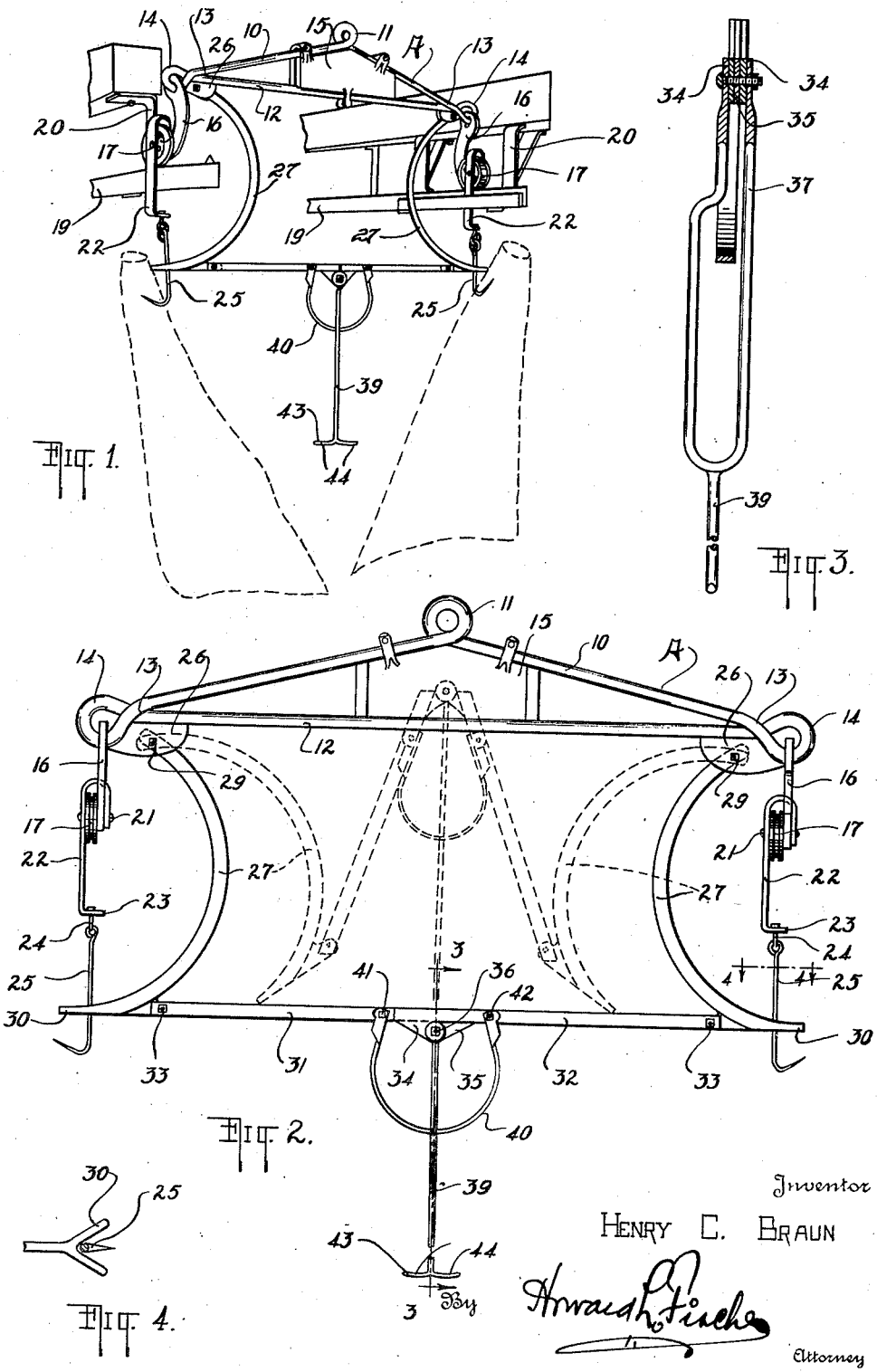
Inventor
HENRY C. BRAUN Patented Jan. 7, 1941

2,227,698

UNITED STATES PATENT OFFICE 2,227,698

COLLAPSIBLE BEEF TREE

Henry C. Braun, St. Paul, Minn., assignor to Superior Packing Company, St. Paul, Minn., a corporation of Illinois Application August 30, 1939, Serial No. 292,637

8 Claims. (Cl. 17—24)

My invention relates to an improvement in collapsible beef trees for supporting beef and the like, wherein it is desired to provide an improved type of collapsible tree easily operable to simplify the task of dressing carcasses.

In the dressing of beef, it is common practice to support the beef by the hind shanks to elevate the beef carcass into vertical position so that the remaining portion of the hide may be removed and the beef may be sided. In accomplishing this operation, it is usual practice to suspend the beef from two spaced hooks upon a beef tree. This beef tree is then elevated so that the beef carcass depends therefrom at a proper height for the siding operation. The fact that the hooks extend through the hind shanks of the carcass, however, tends to cause these hooks to pivot inwardly; so that during the siding operation, the two sides of the beef carcass are extremely close together. This is particularly disadvantageous after the sawing of the beef has been completed and the chopping operation is taking place. The carcass is finally cut in two by means of a cleaver, and the proper position for handling the cleaver is on the under side of the beef. This means that the hands of the person handling the cleaver must be swung between the sides of beef, greatly endangering the operator, as the hands are extremely apt to be torn by the cut edges of the ribs on the under side of the animal.

In order to support the shanks of the animal a greater distance apart so that more room will be provided for the operator to swing the cleaver, I provide a pair of forked arms which are pivoted above the supporting hooks and which are movable into or out of engagement with the hooks. A pair of toggle levers are pivotally connected to these forked arms at a point considerably spaced from the pivot so that by bringing these arms into substantial alignment, the forked arms will bear against the supporting hooks and force them apart. This action naturally separates the hind shanks of the beef to a greater distance and provides more room between the sides of beef so that the persons working upon the beef may have more room to work.

It is a purpose of my invention to provide a beef tree having a pair of hooks pivotally depending therefrom and to provide a means for manually pivoting these hooks away from one another. With this construction, the hooks may be pivoted toward one another for ease in engaging the shanks of the beef and yet may be easily separated when the beef is in elevated position.

In accomplishing my invention, I use a common type of beef tree provided with roller supporting hooks for supporting rollers or trolleys slidable on parallel conveyor rails. These rollers support brackets from which hooks are suspended. It is a purpose of my invention to provide on such a beef tree a simple means for spreading these last named hooks. The spreading device which holds the carcass supporting hooks at a predetermined distance apart therefore holds the sides of the beef spread to a greater distance.

It is a further feature of my invention to provide a beef tree having a means for removably supporting beef hooks or hangers with a spreader which detachably engages these hooks. Thus, when the beef supporting hooks are held in elevated position by the beef tree, the spreader may be used to spread these hooks. However, when the beef supporting hooks are transferred to the conveyor tracks, the spreading means is detached from the hooks together with the beef tree.

These and other objects and novel features of my invention will be more clearly and fully set forth in the following specification and claims.

In the drawing forming part of my specification:

Figure 1 is a perspective view of a beef tree and beef hooks or hangers supported therefrom.

Figure 2 is a front elevational view of my beef tree and spreader for the beef hooks or hangers.

Figure 3 is a sectional view through a portion of the spreader, the position of the section being indicated by the line 3—3 of Figure 2.

Figure 4 is a detailed view of a portion of my device.

The beef tree A comprises an inverted shallow V-shaped support 10 having a central loop 11 to accommodate a fastening means so that the support may be elevated by a hoist. A brace 12 is welded at 13 adjacent the opposed ends of the support 10 to this support. Loops 14 are provided at each end of the support 10. A balancing weight 15 is secured between the support 10 and the brace 12 and is secured thereto in any suitable manner. As this construction is a common construction for a beef tree, none of this precise construction is important in the present invention.

Pivotally supported in each of the loops 14 I provide a roller supporting hook 16. This roller supporting hook is designed to engage around the shaft of a roller 17 or trolley designed to roll upon one of the tracks 19. The tracks 19 are preferably of the flat type supported by suitable hangers 20 and provided with a suitable lander at the ends of the tracks to properly position the trolley wheels or rollers 17 upon the tracks.

The trolley wheels or rollers 17 are supported on a suitable pivot 21 which extends through opposed sides of the bracket 22. The bracket 22 preferably extends below the rail 19 upon which the roller 17 is slidable, and is looped over the top of the roller to provide a bearing support on each side of the roller. The lower extremity of each of the brackets 22 is bent at right angles to provide a flange 23.

An eye-bolt 24 extends through each of the flanges 23 and a beef supporting hook 25 is linked into each eye-bolt 24. It will be seen that the hooks 25 may pivot about the eye-bolt 24 just as the roller supporting hooks 16 may pivot about the loops 14. The structure including each roller 17 with its associated bracket 22 and hook 25 may be termed a movable hanger or trolley hanger for a side of beef. It will be understood that, at the time the beef is first elevated, it is in one piece, but during the time it is held elevated, the beef is split centrally down the back dividing the carcass into two sides. Thus, as the sides move along the rails 19, the beef may be already cut into individual sides, and each side may be dressed separately. After the sides have been properly dressed, both of the trolleys or hangers are ordinarily rolled onto a single track for washing and for any remaining treatment.

My spreading arrangement will now be described as it is attached to the usual construction which has been previously described. Welded to each extremity of the brace 12 and extending on vertical planes from the brace 12 and the loop 14, I provide a pair of spaced plates 26 between which the pivot arms 27 are pivotally secured at 29. The arms 27 are each bowed or curved inwardly from the top and extend outwardly at the top and bottom ends thereof. The lower extremity of each of the arms 27 is forked as best illustrated in Figure 4 of the drawing, and this forked extremity 30 engages the shank of its adjacent hook 25 to pivot this hook 25 outwardly.

A pair of links or toggle levers 31 and 32 are pivotally connected at 33 to the arms 27. These links are provided on their inner ends with interlocking plates 34 and 35 through which may extend a pivot bolt 36. Two plates 34 are provided attached to the link or lever 31, while a single centrally located plate 35 is secured to the other lever 32. The plate 35 is interposed between the plates 34, and a pivot bolt 36 extends through all of these plates and through the bifurcated end 37 of an operating rod 39.

A substantially U-shaped spring 40 is connected pivotally to the lever 31 at 41 and is connected at 42 to the lever 32. This spring 40 tends to fold the arms 27 into the position illustrated in dotted outline in Figure 2 of the drawing. By pulling downwardly on the operating rod 39, however, the levers can be urged into alignment and the spring 40 assists in holding them in this alignment to hold the hooks 25 spread apart.

The operating rod 39 is provided with a substantially T-shaped end 43 having a pair of transversely extending fingers 44 thereupon. These fingers 44 form a grip which can be comfortably engaged by the hand. However, the beef tree is usually too high to be reached by the hand for engagement, and the rod 39 is usually operated by extending one of the fingers 44 through the usual hole in the meat cleaver designed for the purpose of supporting the cleaver when not in use.

It will be noted that when the beef tree is in elevated position and when the arms 27 are in the dotted position illustrated in Figure 2 of the drawing, the hooks 25 will be drawn inwardly a considerable distance by the beef carcass. By pulling downwardly on the operating rod 39, the toggle levers 31 and 32 pivot into alignment, forcing the pivoted arms 27 outwardly until the forked ends 30 thereof engage the hooks 25 and urge these hooks apart until the hooks are in their normal position substantially below the loops 14 on the support 10. These arms 27 hold the rollers 17 or trolleys spaced at the proper distance so that when the trolleys are placed upon the tracks 19, they will go into proper position. The operating rod 39 may then be pushed upwardly, the spring 40 pulling the levers or links 31 and 32 into the dotted position illustrated in Figure 2, whereupon the hooks 16 may be released from the trolleys 17 and the beef tree and its spreading device separated from the individual trolleys supporting the beef.

In accordance with the patent statutes, I have described the principles of construction and operation of my beef tree; and while I have endeavored to set forth the best embodiments thereof, I desire to have it understood that these are only illustrative of a means of carrying out my invention, and that obvious changes may be made within the scope of the following claims without departing from the spirit of my invention.

I claim:

1. A beef tree comprising a pair of spaced hooks, a support for supporting said hooks, a trolley releasably engaged by each said hook, a beef hanger depending from said trolley, and means on said support engageable with said beef hangers for urging said beef hangers apart.

2. A beef tree comprising a pair of spaced trolleys, means detachably supporting said trolleys, means for suspending said supporting means in spaced relation, hook means suspended below said trolleys, a pivotal arm engageable with each said hook, and means connecting said pivotal arms operable to move said arms into and out of engagement with said hooks.

3. A carcass supporting device comprising a pair of track rollers, means disengageably supporting said rollers, means supporting said supporting means in spaced relation, hanging means suspended beneath said rollers, and means on said second named supporting means engageable with said hanging means to urge said hanging means apart.

4. A carcass hanging means comprising a pair of trolleys, supporting means for said trolleys, means pivotally suspending said supporting means in spaced relation, hook means pivotally depending from said trolleys, arms means pivotally secured to said suspending means and engageable with said hooks, and means for pivoting said arms into and out of engagement with said hooks.

5. A carcass hanging device comprising a pair of spaced trolleys, detachable means supporting said trolleys, suspending means pivotally supporting said supporting means in spaced relationship, beef hanging means suspended from said trolleys, a pair of arms pivotally secured to said suspending means engageable with said hanging means, a pair of pivoted links interposed between said hanging means, and means for pivotally moving said links in unison to move said arms into and out of engagement with said hanging means.

6. A carcass hanging device comprising a pair of opposed hooks, means pivotally supporting said hooks, means suspending said supporting means in spaced relation, a pair of arms pivotally secured to said suspending means, and means for pivoting said arms into and out of engagement with said hooks.

7. A carcass hanging device comprising a pair of hooks, means pivotally supporting said hooks in spaced relation, a pair of arms pivoted to said supporting means, and means pivoting said arms in unison, said arms engaging said hooks to urge the same apart.

8. A carcass hanging device comprising a beef tree, a pair of spaced hooks depending from said beef tree, a pair of curved arms pivotally secured to said beef tree, forked ends on said arms engageable with said hooks, a pair of toggle levers connecting said arms, spring means for urging said toggle levers in one direction, and means for pivoting said levers into alignment to urge said hooks apart.

HENRY C. BRAUN.